Patented June 13, 1939

2,162,507

UNITED STATES PATENT OFFICE 2,162,507

MANUFACTURE OF AZO DYESTUFFS

Arthur Howard Knight, Blackley, England, assignor to Imperial Chemical Industries Limited, a corporation of Great Britain No Drawing. Application August 28, 1936, Serial No. 98,405. In Great Britain August 30, 1935

13 Claims. (Cl. 260—198)

This invention relates to the manufacture of new monoazo dyestuffs and compositions and to methods of making the same, to the dyeing of materials, such as fibres with said dyestuffs, to materials dyed with said dyestuffs, and especially to azo dyes which are formed by coupling a diazotized aryl nucleus-long-chain alkyl amine having 8 to 20 carbons in the alkyl group with an aminonaphthol sulphonic acid as will be hereinafter more fully described.

In British Specification 443835, there is claimed the manufacture of monoazo dyestuffs by combining a diazotised nuclear-long-chain alkyl ($C_8$—$C_{20}$)-aniline with a coupling component devoid of long-chain alkyl ($C_8$—$C_{20}$) groups. The new dyestuffs of the present invention are not described in the said specification. The new dyestuffs are characterized by the desirable brown shades of excellent fastness to milling and washing in which they dye animal fibres in aqueous neutral or acid solutions. They are further characterized by having alkyl groups in the amine of the naphthol-sulphonic acid coupling component.

It is among the objects of the invention to provide new dyestuffs and methods of making the same, to provide new compositions containing the dyestuffs, and to provide materials and fibres dyed with the dyestuffs. Other objects of the invention will be apparent from the following description of the invention which will be made with reference to examples which are intended to illustrate but not to limit the invention thereto.

The objects of the invention are attained by diazotizing aryl amines having one or more benzene nuclei which amines have a nuclear alkyl group of 8 to 20 carbon atoms. The coupling components are amino-naphthol sulphonic acids. The dyestuffs are soluble in hot water and aqueous acid solutions and are substantive to animal fibres. In dyeing animal fibres the dyes are applied to the fibre, such as wool or leather in suitable solutions.

According to the invention we manufacture new dyestuffs by coupling, in alkaline aqueous medium, a diazotized amine of the benzene series having a nuclear alkyl group of 8 to 20 carbon atoms, with an aminonaphthol sulphonic acid having the general formula which is represented as follows:

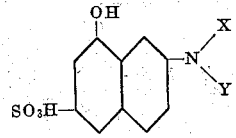

where X stands for lower alkyl or hydroxyalkyl and Y stands for hydrogen hydroxyalkyl, acyl, aroyl or arylsulphonyl. By lower alkyl we mean methyl, ethyl, propyl and butyl. More generally the amino-naphthol sulphonic acid is represented by the following formula in which X and Y have the same significance as in the foregoing formula.

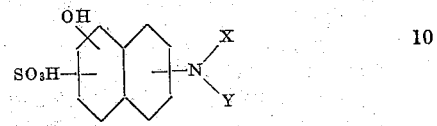

The new dyestuffs made according to the invention are water-soluble and dye animal fibres in various shades of brown, the dyeings on wool having excellent fastness to milling.

The invention is illustrated but not limited by the following examples, in which the parts are by weight.

Example I 26.1 parts of p-dodecylaniline are suspended in a mixture of 200 parts of water and 100 parts of 10% hydrochloric acid and diazotized at 5–10° C. by the addition of 6.9 parts of sodium nitrite. The diazonium solution so-obtained is then stirred into an ice-cold solution of 305 parts of the sodium salt of 2-N-β-hydroxy-ethylamino-8-naphthol-6-sulphonic acid in 400 parts of water to which 21 parts of anhydrous sodium carbonate have been added. Coupling is rapid and the new dyestuff so formed separates from the coupling mixture. When coupling is complete it is filtered off, washed with 5% brine and dried in any suitable way. The product is a brown powder which dissolves in hot water to a reddish-brown solution and in concentrated sulphuric acid to a crimson-red solution. The product is represented by the following formula:

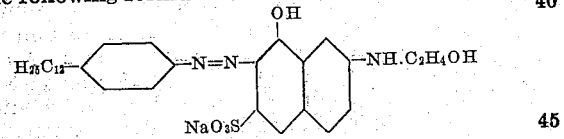

The new dyestuff dyes wool in brown shades of very good fastness to milling.

The dyestuff may be applied to wool from either an acid or neutral dyebath as indicated below:—

(a) *Acid dyebath*

100 parts of wool are entered at 40° C. into a dyebath comprising 1 part of the dyestuff of Example 1 dissolved in 6000 parts of water. 3 parts of glacial acetic acid are then added, the dyebath is heated to 95°–100° C. during ½ hour and maintained at that temperature for 1 hour. The wool is then removed, rinsed and dried.

(b) Neutral dyebath 100 parts of wool are entered at 40°–50° C. into a dyebath comprising 1 part of the dyestuff of Example 1 and 2 parts of sodium cetyl sulphate dissolved in 6,000 parts of water. The dyebath is heated to 95°–100° C. during ½ hour and maintained at that temperature for a further half hour. 10 parts of 10% aqueous ammonium acetate are added and dyeing continue at 95°–100° C. for a further ½ hour. The wool is then rinsed and dried.

EXAMPLE II

A solution of 36.3 parts of the sodium salt of p-dodecylaniline-m-sulphonic acid in 400 parts of warm water containing 6.9 parts of sodium nitrite is slowly added with good stirring to a mixture of 650 parts of water and 130 parts of 10% hydrochloric acid at 5–10° C. When diazotisation is complete the suspension of the diazo compound is added to a solution in 400 parts of water of 37.5 parts of the sodium salt of 2-N-β-hydroxyethyl-N-n-butyryl-amino-8-naphthol-6-sulphonic acid to which has been added 31 parts of anhydrous sodium carbonate. When coupling is complete 10% salt (weight for volume) are added to the coupling mixture and the precipitated dyestuff filtered off and dried in any suitable way. The product is represented by the following formula:

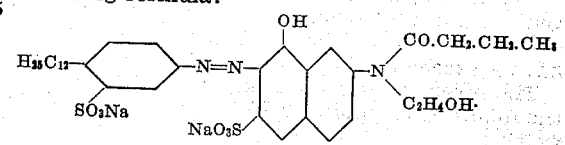

The new dyestuff dyes wool in reddish-brown shades of very good fastness to milling. It is also suitable for dyeing leather.

The dyestuff of Example II may be applied to leather in the following way.

100 parts of sumac-tanned grain sheepskin (skivers) are wetted out and introduced into a suitable wheel or paddle with 500 parts of water at 45° C. A solution of 1 part of dyestuff in 100 parts of water is then added and dyeing continued at 45° C. for 40 minutes. 0.5 parts of commercial formic acid diluted with 10 parts of water is then added and dyeing again continued at 45° C. for a further 20 minutes. The leather is then removed, rinsed in cold water and dried. A medium red-brown dyeing is obtained.

EXAMPLE III 36.3 parts of the sodium salt of p-dodecylaniline-m-sulphonic acid are diazotised as in Example II. The suspension of the diazo compound is then added with stirring to a solution at 5° C. of 40.9 parts of the sodium salt of 2-N-benzoyl-N-β-hydroxyethylamino-8-naphthol-6-sulphonic acid and 31 parts of anhydrous sodium carbonate in 500 parts of water. Coupling is rapid and when complete the dyestuff is filtered off, washed with 5% brine and dried.

The product is represented by the following formula:

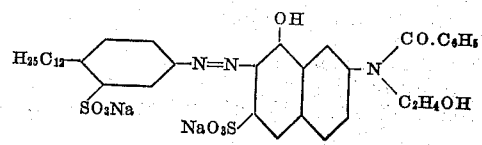

The new dyestuff dries to a dark brown powder which dissolves in hot water to a reddish-brown solution and in concentrated sulphuric acid to a red solution. It dyes wool in reddish-brown shades of good fastness to severe washing and very good fastness to milling and light. The dye may be applied in the manner similar to that described in the foregoing examples.

EXAMPLE IV 36.3 parts of the sodium salt of p-dodecylaniline-m-sulphonic acid are diazotized as in Example II. The suspension of the diazo compound is then added to a solution at 5° C. of 34.7 parts of the sodium salt of 2-N-acetyl-N-β-hydroxyethylamino-8-naphthol-6-sulphonic acid and 31 parts of anhydrous sodium carbonate in 400 parts of water. Coupling is rapid and when complete the new dyestuff is isolated by salting with 20% common salt (weight for volume) and filtering. The dyestuff paste is then washed with 20% brine and dried. The new dyestuff forms a dark brown powder, which dissolves in water to a reddish-brown solution and in concentrated sulphuric acid to a bluish-red solution.

The product is represented by the following formula:

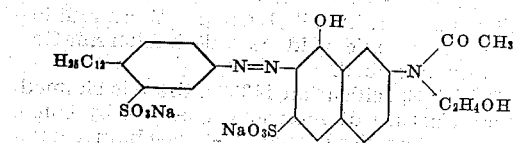

It dyes wool in brown shades of very good fastness to milling. The dye may be applied in the manner similar to that described in the foregoing examples.

EXAMPLE V 26.1 parts of p-dodecylaniline are diazotized as in Example 1. The solution of the diazo compound so obtained is added to an ice-cold solution of 3715 parts of the sodium salt of 2-N-β-hydroxyethyl-N-n-butyryl-amino-8-naphthol-6-sulphonic acid and 21 parts of anhydrous sodium carbonate in 400 parts of water. The new dyestuff so formed is filtered off, washed with a little weak brine solution and dried. The new dyestuff dries to a dark brown powder which dissolves in warm water to reddish-brown solution and in concentrated sulphuric acid to a crimson-red solution. It dyes wool in reddish-brown shades of very good fastness to milling. The dye may be applied in the manner similar to that described in the foregoing examples.

EXAMPLE VI

If 34.7 parts of the sodium salt of 2-N-acetyl-N-β-hydroxyethylamino-8-naphthol-6-sulphonic acid are used instead of 37.5 parts of the sodium salt of 2-N-n-butyryl-N-β-hydroxyethylamino-8-naphthol-6-sulphonic acid in Example V, a new dyestuff having similar excellent fastness properties is obtained.

The new dyestuff forms a dark brown powder which dissolves in warm water to a reddish-brown solution and in concentrated sulphuric acid to a bluish-red solution. It dyes wool in reddish-brown shades which are rather yellower than those given by the dyestuff of Example V.

The product is represented by the following formula:

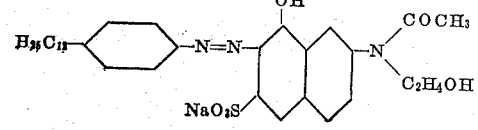

The dye may be applied in the manner similar to that described in the foregoing examples.

Further examples of dyestuffs made according to the invention are given in the following table.

solution of its sodium salt by reacting a neutral aqueous solution of one molecular proportion of sodium salt of 2-N-β-hydroxyethylamino-8-naphthol-6-sulphonic acid for about an hour with an

| Ex. No. | Diazo component | Coupling component | Formula of product | Shade on wool |
|---|---|---|---|---|
| VII | p-Dodecylaniline-o-sulphonic acid | 2-N-acetyl-N-β-hydroxyethylamino-8-naphthol-6-sulphonic acid | $H_{25}C_{12}$—C₆H₃(SO₃Na)—N=N—naphthol(OH)(NaO₃S)—N(COCH₃)(C₂H₄OH) | Reddish-brown (yellower than Ex. IV) |
| VIII | p-Cetylaniline | do | $H_{33}C_{16}$—C₆H₄—N=N—naphthol(OH)(NaO₃S)—N(COCH₃)(C₂H₄OH) | Brown |
| IX | p-Decylaniline | do | $H_{21}C_{10}$—C₆H₄—N=N—naphthol(OH)(NaO₃S)—N(COCH₃)(C₂H₄OH) | Do. |
| X | 1-methyl-5-dodecyl-2-aminobenzene | do | $H_{25}C_{12}$—C₆H₃(CH₃)—N=N—naphthol(OH)(NaO₃S)—N(COCH₃)(C₂H₄OH) | Do. |
| XI | p-Dodecylaniline | 2-N-methylamino-8-naphthol-6-sulphonic acid | $H_{25}C_{12}$—C₆H₄—N=N—naphthol(OH)(NaO₃S)—N(H)(CH₃) | Red-brown |
| XII | do | 2-N-acetyl-N-methylamino-8-naphthol-6-sulphonic acid | $H_{25}C_{12}$—C₆H₄—N=N—naphthol(OH)(NaO₃S)—N(COCH₃)(CH₃) | Orange-brown |
| XIII | do | 2-N-methyl-N-β-hydroxy-ethylamino-8-naphthol-6-sulphonic acid | $H_{25}C_{12}$—C₆H₄—N=N—naphthol(OH)(NaO₃S)—N(CH₃)(C₂H₄OH) | Brown |
| XIV | p-Dodecylaniline-m-sulphonic acid | do | $H_{25}C_{12}$—C₆H₃(SO₃Na)—N=N—naphthol(OH)(NaO₃S)—N(CH₃)(C₂H₄OH) | Brown (little yellower than Ex. XIII) |
| XV | do | 2-N-β-hydroxyethylamino-8-naphthol-6-sulphonic acid | $H_{25}C_{12}$—C₆H₃(SO₃Na)—N=N—naphthol(OH)(NaO₃S)—N(H)(C₂H₄OH) | Brown |
| XVI | p-Dodecylaniline | 2-N-benzoyl-N-β-hydroxy-ethylamino-8-naphthol-6-sulphonic acid | $H_{25}C_{12}$—C₆H₄—N=N—naphthol(OH)(NaO₃S)—N(COC₆H₅)(C₂H₄OH) | Reddish-brown |
| XVII | do | 2-N-p-toluene-sulphonyl-N-β-hydroxyethlamino-8-naphthol-6-sulphonic acid | $H_{25}C_{12}$—C₆H₄—N=N—naphthol(OH)(NaO₃S)—N(SO₂C₆H₄CH₃)(C₂H₄OH) | Red-brown |
| XVIII | p-Dodecylaniline-m-sulphonic acid | 2-N-ββ'-dihydroxydiethyl-amino-8-naphthol-6-sulphonic acid | $H_{25}C_{12}$—C₆H₃(SO₃Na)—N=N—naphthol(OH)(NaO₃S)—N(C₂H₄OH)(C₂H₄OH) | Brown |

2-N-acetyl-N-β-hydroxyethylamino-8-naphthol-6-sulphonic acid is obtained as an aqueous excess of acetic anhydride, that is with more than one molecular proportion of acetic anhydride, and then making the reaction mixture faintly alkaline by addition of sodium carbonate. It is represented by the following formula:

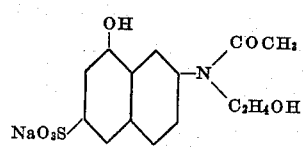

Aqueous solutions of the sodium salt of 2-N-n-butyryl-N-β-hydroxyethylamino-8-naphthol-6-sulphonic acid or of 2-N-benzoyl-N-β-hydroxyethylamino-8-naphthol-6-sulphonic acid are obtained in a similar way by using n-butyric anhydride or benzoyl chloride respectively instead of acetic anhydride. They are represented by the following formulae:

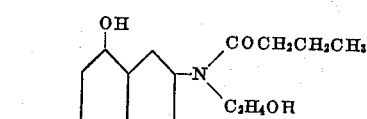

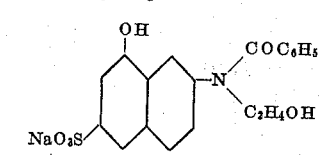

p-Dodecylaniline-m-sulphonic acid may be prepared by sulphonating p-dodecylaniline with 100% sulphuric acid and the corresponding o-sulphonic acid may be obtained by sulphonating with chlorosulphonic acid in tetrachlorethane medium (see co-pending application 1619/36). They are represented by the following formulae:

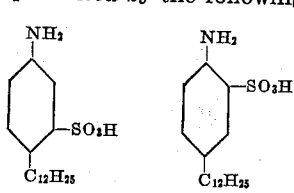

Although numerous examples of dyes and the components thereof are specifically mentioned, many other components and the coupled compounds derivable therefrom will be suggested to those skilled in the art without departing from the spirit and scope of the invention described in the foregoing specification. Therefore, no limitations are intended in the specification and claims except those which are specifically expressed or imposed by the prior art.

I claim:

1. An azo dye being the product of coupling in alkaline aqueous medium a diazotized primary aryl amine of the benzene series having a nuclear alkyl group of 8 to 20 carbon atoms in the para position to the amino group, with an amino naphthol sulfonic acid represented by the formula

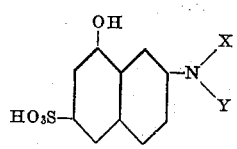

in which X represents one of a group consisting of lower alkyl and hydroxyalkyl, and Y represents one of a group consisting of hydrogen, hydroxyalkyl, aralkyl, aroyl and arylsulfonyl.

2. An azo dye represented by the formula

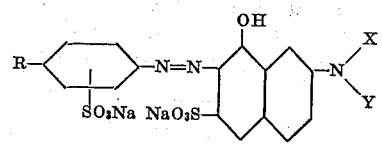

in which R is an alkyl group of 8 to 20 carbons, X is one of the group consisting of lower alkyl and hydroxyalkyl and Y is one of the group consisting of hydrogen, hydroxyalkyl, acyl, aroyl and arylsulfonyl.

3. An azo dye represented by the formula

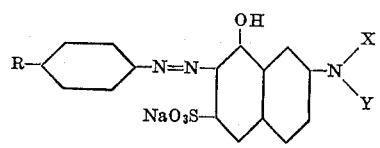

in which R is an alkyl group of 8 to 20 carbons, X is one of the group consisting of lower alkyl and hydroxyalkyl and Y is on of the group consisting of hydrogen, hydroxyalkyl, acyl, aroyl and arylsulfonyl.

4. A compound produced by diazotizing p-dodecylaniline and coupling with the sodium salt of 2-N-β-hydroxy-ethylamino-8-naphthol-6-sulphonic acid.

5. A compound produced by diazotizing p-dodecylaniline m-sulphonic acid and coupling with the sodium salt of 2-N-β-hydroxyethyl-N-n-butyryl-amino-8-naphthol-6-sulphonic acid.

6. A compound produced by diazotizing p-dodecylaniline-m-sulphonic acid and coupling with the sodium salt of 2-N-benzoyl-N-β-hydroxyethylamine-8-naphthol-6-sulphonic acid.

7. An animal fibre dyed with a dyestuff identical with that which is made by coupling in aqueous medium, diazotized p-dodecylaniline with the sodium salt of 2-N-β-hydroxy-ethylamino-8-naphthol-6-sulphonic acid.

8. An animal fibre dyed with a dyestuff identical with that which is made by coupling in aqueous medium, diazotized p-dodecylaniline-m-sulphonic-acid with the sodium salt of 2-N-β-hydroxyethyl-N-n-butyryl-amino-8-naphthol-6-sulphonic acid.

9. An animal fibre dyed with a dyestuff identical with that which is made by coupling in aqueous medium, diazotized p-dodecylaniline-m-sulphonic acid with the sodium salt of 2-N-benzoyl-N-β-hydroxyethylamino-8-naphthol-6-sulphonic acid.

10. Process for the manufacture of new azo dyestuffs which comprises coupling in alkaline aqueous medium a diazotized primary aryl amine of the benzene series having a nuclear alkyl group of 8 to 20 carbon atoms in the para position to the amino group, with an amino naphthol sulfonic acid represented by the formula

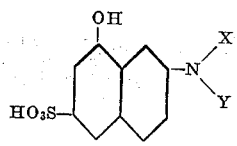

in which X represents one of a group consisting of lower alkyl and hydroxyalkyl, and Y represents one of a group consisting of hydrogen, hydroxyalkyl, aralkyl, aroyl and arylsulfonyl.

11. The process of making an azo dyestuff which comprises coupling, in aqueous medium, diazotized p-dodecylaniline with the sodium salt of 2-N-β-hydroxy-ethylamino-8-naphthol-6-sulphonic-acid.

12. The process of making an azo dyestuff which comprises coupling, in aqueous medium, diazotized p-dodecylaniline-m-sulphonic-acid with the sodium salt of 2-N-β-hydroxyethyl-N-n-butyryl-amino-8-naphthol-6-sulphonic acid.

13. The process of making an azo dyestuff which comprises coupling, in aqueous medium, diazotized p-dodecylaniline-m-sulphonic acid with the sodium salt of 2-N-benzoyl-N-β-hydroxyethylamino-8-naphthol-6-sulphonic acid.

ARTHUR HOWARD KNIGHT.